United States Patent [19]

Cariés

[11] 4,366,090

[45] Dec. 28, 1982

[54] PROCESS FOR THE PREPARATION OF ADSORBENT MATERIALS

[75] Inventor: Jean-Claude Cariés, Manosque, France

[73] Assignee: Commissariat a l'Energie Atomique, Paris, France

[21] Appl. No.: 247,201

[22] Filed: Mar. 24, 1981

[30] Foreign Application Priority Data

Apr. 2, 1980 [FR] France .................................. 80 07460

[51] Int. Cl.³ ......................... B01J 20/10; B01J 20/32
[52] U.S. Cl. .................................... 252/459; 252/454; 252/449
[58] Field of Search ................. 252/451, 452, 454, 459

[56] References Cited

U.S. PATENT DOCUMENTS

| | | | |
|---|---|---|---|
| 1,999,210 | 4/1935 | Rembert | 252/452 |
| 2,265,389 | 12/1941 | Melaven | 252/454 X |
| 2,344,911 | 3/1944 | Young | 252/451 X |
| 2,407,247 | 9/1946 | Briggs | 252/459 |
| 2,699,376 | 1/1955 | Hay | 252/451 X |

*Primary Examiner*—Carl F. Dees
*Attorney, Agent, or Firm*—Michael N. Meller; Anthony H. Handal

[57] ABSTRACT

Process for the preparation of an adsorbent material, wherein it consists of preparing an aqueous solution of an alkali metal silicate and a compound selected from the group comprising alkali metal hydroxides and ammonia, mixing the solution with an adsorbent substance in the form of a powder or gel and subjecting the thus obtained mixture to a heat treatment.

The invention also relates to adsorbent materials comprising an inert mineral support in which is incorporated an adsorbent substance.

11 Claims, No Drawings

PROCESS FOR THE PREPARATION OF ADSORBENT MATERIALS

BACKGROUND OF THE INVENTION

The present invention relates to a process for the preparation of adsorbent materials usable for the treatment or analysis of liquids.

More specifically, it relates to adsorbent materials comprising an inert mineral support in which is an adsorbent substance incorporated.

Over the last few years, solid adsorbent materials have been increasingly used in such varied fields as the analysis and control of the environment, the treatment of liquid or solid waste and the recovery of compounds required by industry as the result of their cost and scarcity. Numerous mineral or organic adsorbent substances having ion exchange and/or adsorption properties can be used for this purpose and are selected as a function of the nature and physicochemical form of the elements to be fixed.

Hitherto, such solid materials having adsorbent properties have been prepared by impregnating an organic inert support, e.g. polyethylene or polyurethane, or an inert mineral support, e.g. silica or alumina by means of adsorbent substances. However, due to this preparation procedure, the support constitutes in this case a large part of the total weight of the adsorbent material obtained.

Moreover, the production of such adsorbent materials causes certain problems when it is desired to obtain them in the form of solid phase of specific grain size distribution retaining all the properties of the adsorbent substance and additionally having adequate mechanical characteristics and a good resistance to chemical agents.

BRIEF SUMMARY OF THE INVENTION

The present invention is directed at a process for the preparation of an adsorbent material comprising an inert mineral support in which is incorporated an adsorbent substance, making it possible to obtain materials with a high degree of porosity having a large content of an adsorbent substance and also having the advantage of being uncomplicated and inexpensive, whilst requiring only very few additional operations to transform the solid material obtained into a powder with the desired grain size.

The present invention therefore relates to a process for the preparation of an adsorbent material, comprising (1) preparing an aqueous solution of an alkali metal silicate and a compound selected from the group comprising alkali metal hydroxides and ammonia, mixing (2) the solution with an adsorbent substance in the form of a powder or gel, and subjecting the thus obtained mixture to a heat treatment.

Through the use of an aqueous solution containing an alkali metal hydroxide or ammonia, it is possible to obtain by the process of the invention a material with a high porosity level. Thus, the addition to the aqueous solution of the alkali metal silicate and an alkali metal hydroxide or ammonia makes it possible to obtain a distinctly basic pH and this greatly aids the formation of a high porosity crystalline system during the subsequent heating and drying phases.

Moreover, this process of this invention also has the advantage of only requiring a heat treatment for directly obtaining an inert material support in which an adsorbent substance is incorporated.

Moreover, the performance of this heat treatment does not modify the nature and properties of the adsorbent substances added to the solution. Thus, this process is simple and inexpensive to perform, which is advantageous for use on an industrial scale.

Furthermore, by starting with an aqueous solution to which is added the adsorbent substance, it is possible to obtain adsorbent materials having a high content of adsorbent substance, e.g. 70 to 80% by weight of adsorbent substance, which is not the case with the prior art processes in which the adsorbent substance is fixed to a solid support by impregnation.

According to an advantageous embodiment of the invention, the initial aqueous solution comprises by a solution for an alkali metal silicate and a hydroxide of the same alkali metal. Preferably, sodium hydroxide and silicate are used.

The choice of such mineral compounds for forming the inert support has the advantage that is results in an adsorbent material having a good mechanical strength and a good resistance to acids.

According to the process of the invention, the adsorbent substance used can be acid, neutral or basic. Examples of adsorbent substances which can be used are the oxides or hydroxides of iron, manganese, titanium, zirconium, etc. although the possible substances are not restricted to those enumerated.

Advantageously, the adsorbent substance is titanium hydroxide, ferric hydroxide, or manganese oxide.

When using titanium hydroxide, it is preferably added to the aqueous solution in the form of a gel which can, for example, be obtained by adding soda to a potassium titanyl oxalate solution followed by flocculation of the thus obtained colloidal precipitate.

When using ferric hydroxide, it is added in the form of flakes obtained by the neutralization of a ferric chloride solution.

When manganese oxide is used, it is generally added to the solution in the form of $MnO_2$ powder.

According to the invention, preferably the heat treatment is performed in at least two stages at different temperatures, involving at least a first stage at a temperature below 100° C. and a second stage at a temperature of 100° to 400° C.

Advantageously, the heat treatment is performed in two stages at different temperatures, the first stage being performed at a temperature below 100° C. for about 1 day and the second stage being performed at a temperature above 100° C. and below 400° C. for a few hours, in order to obtain a product whose weight remains constant.

In the case of performing the process according to the invention for preparing an adsorbent material from an aqueous solution of sodium hydroxide and silicate, to which is added an adsorbent substance powder or gel, the heat treatment is advantageously performed in three stages, the first stage being performed at approximately 60° C. for about 28 hours, the second stage at approximately 90° C. for about 6 hours and the third stage at approximately 180° C. until a constant weight is obtained.

After the heat treatment, a porous adsorbent material is obtained having a specific surface of at least 200 $m^2/g$ (hot B.E.T. method).

According to the invention, it is possible to control the specific surface of the adsorbent material obtained by regulating to an appropriate value the temperature at which the final stage of the heat treatment is performed. Thus, the specific surface of the adsorbent material obtained increases with the treatment temperature used.

It is pointed out that the adsorbent materials obtained in this way can be used as they are in the form of a porous percolation structure or can be transformed into particles, whose dimensions are adjusted as a function of the intended use by simple grinding and screening operations.

Generally, when starting with a solution containing an alkali metal hydroxide, the adsorbent material obtained is washed to remove the excess hydroxide. Conversely, when starting with a solution containing ammonia, there is no need to carry out a washing process because the ammonia is eliminated by volatilization.

The invention also relates to an adsorbent material usable for the treatment or analysis of liquids containing organic or mineral substances. This material comprises an inert mineral support of an alkali metal silicate and a hydroxide of the same alkali metal and an adsorbent material incorporated into this support. Preferably, the inert support comprises sodium hydroxide and silicate.

Advantageously, the adsorbent substance is titanium hydroxide, ferric hydroxide or manganese oxide. Preferably, the adsorbent material contains 70 to 80% by weight of the adsorbent substance.

The adsorbent materials according to the invention can be used for extracting mineral or organic compounds during the treatment of radioactive or non-radioactive industrial effluents, as well as for measures connected with the contamination of the environment.

In particular, such adsorbent materials containing titanium hydroxide can be used for recovering uranium from aqueous solutions such as drainage waters.

DESCRIPTION OF ADVANTAGEOUS EMBODIMENTS OF THE INVENTION

Other advantages and characteristics of the invention are evident from the following examples which are given in an illustrative and non-limiting manner.

EXAMPLE 1

This example relates to the preparation of an adsorbent material comprising a mineral support of sodium hydroxide and silicate in which titanium hydroxide is incorporated.

Firstly, a solution of sodium hydroxide and silicate is prepared by mixing 38 ml of an industrial sodium silicate solution $Na_2SiO_3$ having a density of 1.33 to 1.34 with 13 ml of a soda solution having a density of 1.32.

In addition, a titanium hydroxide gel is prepared from a potassium titanyl oxalate solution in distilled water. This solution is adjusted to a pH of 6.5 to 6.8 by adding soda, then the thus obtained colloidal precipitate is flocculated by means of an anionic flocculant (Maganfloc) in order to facilitate its filtration. After flocculation and filtration, a titanium hydroxide gel is obtained, whose water content is approximately 90%.

The sodium hydroxide and silicate solution is then added to 500 g of this titanium hydroxide gel and the total mixture is then intimately mixed, followed by a heat treatment under the following conditions:
 a first stage performed at 60° for 20 hours,
 a second stage performed at 90° C. for 6 hours,
 a third stage performed at 180° C. until a constant weight is obtained.

The solid adsorbent material obtained after the heat treatment has a specific surface of 200 $m^2/g$ a titanium hydroxide content of 73% and a porous volume of 1030 $mm^3/g$.

This material is converted into particles by grinding and screening so as to give a grain size distribution between 0.5 and 2 mm for use in the extraction of uranium from the drainage waters of mines in the following manner.

The grains or particles are placed in a column, they are then brought into the form $H^+$ by using an approximately 2 N hydrochloric acid solution, followed by their rinsing with demineralized water. The uranium solution is then circulated in the column, making it possible to obtain a fixing capacity of approximately 10 mg of uranium per gram of adsorbent material under the following operating conditions:
 adsorbent volume: 66 ml,
 column diameter: 20 mm,
 bed height: 210 mm,
 fixing and elution rate: 450 ml/h, i.e. 6.8 v/v/h,
 eluent: $HNO_3 \simeq 2$ N,
 elution level: 95% with 4.5 v/v.

If in this adsorbent material preparation example soda is replaced by ammonia, an adsorbent material is obtained which has the same characteristics.

EXAMPLE 2

This example relates to the preparation of adsorbent material containing as the adsorbent substance ferric hydroxide $Fe(OH)_3$.

As in example 1, a sodium hydroxide and silicate solution is prepared by using the same quantities of products.

In addition, a gel of ferric hydroxide $Fe(OH)_3$ is prepared by neutralizing a ferric chloride solution to pH 7.

The sodium hydroxide and silicate solution is then added to 500 g of this ferric hydroxide gel and the total mixture is intimately mixed, followed by heat treatment under the same conditions as given in example 1.

The solid adsorbent material obtained after this heat treatment has a specific surface of 214 $m^2/g$.

For comparison, a commercially available material, also containing ferric hydroxide $Fe(OH)_3$ as the adsorbent material, only has a specific surface of 158 $m^2/g$.

Thus, the process according to the invention leads to a significant improvement in the porosity of the material obtained.

EXAMPLE 3

This example relates to the preparation of an adsorbent material containing $MnO_2$ as the adsorbent substance.

A sodium hydroxide and silicate solution is prepared by mixing 40 ml of an industrial sodium silicate solution $Na_2SiO_3$ having a density of 1.33 to 1.34 with 20 ml of a 32% NaOH solution.

Then 13 g of manganese dioxide powder $MnO_2$ are added to the sodium hydroxide and silicate solution and the total mixture is intimately mixed, followed by heat treatment under the same conditions as given in example 1.

The solid adsorbent material obtained after this heat treatment has a specific surface of 201 $m^2/g$.

For comparison, it is pointed out that the presently available commercial product containing manganese hydroxide has a specific surface of 124 $m^2/g$.

EXAMPLE 4

This example relates to the preparation of an adsorbent material comprising a sodium silicate support in which titanium hydroxide is incorporated.

In this case, the adsorbent material is prepared by adding 500 g of titanium hydroxide gel prepared in the same way as in example 1 to 38 ml of an industrial sodium silicate solution $Na_2SiO_3$ with a density of 1.33 to 1.34 and the total mixture obtained is intimately mixed, followed by a heat treatment performed under the same conditions as in example 1.

The adsorbent material obtained in this way has a specific surface of $165\pm5$ m$^2$/g.

By comparing this result with that of example 1 when starting with a sodium hydroxide and silicate solution, it is clear that the addition of soda to the initial solution makes it possible to obtain a significant improvement to the specific surface of the adsorbent material obtained.

EXAMPLE 5

This example illustrates the influence of the temperature used in the final heat treatment stage on the specific surface of the adsorbent material obtained.

In the same way as described in example 1, a mixture of sodium hydroxide and silicate solution and titanium hydroxide gel is prepared and this mixture then undergoes a heat treatment under the same conditions as described in example 1 for the first two stages, whilst the third stage is either performed at 100° C. or at 440° C. until a constant weight is obtained.

The solid adsorbent material obtained after this heat treatment has a specific surface of 135 m$^2$/g when the final stage is performed at 100° C. and a specific surface of 180 m$^2$/g when the final stage is performed at 440° C.

By comparing these results with those obtained in example 1, it is clear that the specific surface of the material obtained increases with the temperature used in the final heat treatment stage, but if the heat treatment is carried out at a temperature above 400° C. there is a tendency for this effect to be reversed.

What is claimed is:

1. A process for the preparation of an adsorbent material, comprising
   (a) an aqueous solution of an alkali metal silicate and a compound selected from the group comprising alkali metal hydroxides and ammonia,
   (b) admixing the solution with an adsorbent substance selected from the group consisting of the oxides and hydroxides of iron, manganese, titanium and zirconium in the form of a powder or gel; and
   (c) subjecting the thus obtained mixture to a heat treatment.

2. The process as in claim 1, wherein the aqueous solution is a solution of a silicate and a hydroxide of the same alkali metal.

3. The process as in claim 2, wherein the alkali metal is sodium.

4. The process as in claim 1, wherein the heat treatment is performed in at least two stages at different temperatures, involving at least a first stage at a temperature below 100° and a second stage at a temperature of 100° to 400° C.

5. The process as in claim 1, wherein the heat treatment is performed in two stages at different temperatures, the first stage being performed at a temperature below 100° C. for about 1 day and the second stage being performed at a temperature above 100° C. and below 400° C. for a few hours in order to obtain a product, whose weight remains constant.

6. A process as in claim 1, wherein the specific surface of the adsorbent material obtained is controlled by regulating the temperature at which the final stage of the heat treatment is performed to an appropriate value.

7. A material which can be used in the treatment or analysis of liquids comprising of an inert mineral salt of alkali metal silicate support, a hydroxide of the same alkali metal and an adsorbent substance selected from the group consisting of the oxides and hydroxides of iron, manganese, titanium and zirconium incorporated in said support.

8. The material as in claim 7, wherein the inert support is sodium hydroxide and silicate.

9. The material as in claim 7, wherein it has a specific surface of at least 200 m$^2$/g.

10. The material as in claim 7, wherein it comprises 70 to 80% by weight of said adsorbent substance.

11. A process as in claim 1, wherein the heat treatment is performed in three stages; with the first stage being performed at approximately 60° C. for about 28 hours; the second stage at approximately 90° C. for about 6 hours and the third stage at approximately 180° C. until a constant weight is obtained.

* * * * *